(12) United States Patent
Gartner

(10) Patent No.: US 8,272,839 B2
(45) Date of Patent: Sep. 25, 2012

(54) OSCILLATING ENERGY CAPTURE MECHANISM

(76) Inventor: Matthew Charles Gartner, Strathmore (CA)

(*) Notice: Subject to any disclaimer, the term of this patent is extended or adjusted under 35 U.S.C. 154(b) by 685 days.

(21) Appl. No.: 12/461,396

(22) Filed: Aug. 11, 2009

(65) Prior Publication Data
US 2009/0302612 A1 Dec. 10, 2009

Related U.S. Application Data

(63) Continuation-in-part of application No. 11/984,850, filed on Nov. 23, 2007, now Pat. No. 8,142,154.

(51) Int. Cl.
*F03D 5/06* (2006.01)
(52) U.S. Cl. ....................... 416/81; 416/132 A
(58) Field of Classification Search ............... 416/6, 79, 416/81, 82, 83, 86, 132 A
See application file for complete search history.

(56) References Cited

U.S. PATENT DOCUMENTS
7,626,281 B2 * 12/2009 Kawai ........................ 290/54
* cited by examiner

*Primary Examiner* — Richard Edgar

(57) ABSTRACT

Multiple pivots are mounted vertically or horizontally within a rotary or stationary support structure or platform. The pivots are interconnected via members, and between these pivots, a flexible sheet of material is suspended. The mechanism operates via oscillation of a flexible sheet that captures the energy in a fluid flow, and converts it into mechanical motion. The interconnected pivots act in synchronization to vary the angle of attack of the flexible sheet, creating low pressure (lift) areas that impart force into the pivots which then move in an oscillating manner, outputting the energy captured to an energy conversion device. An alternate embodiment makes use of anchors and suspension structures that suspend the entire embodiment in the middle of a fluid flow, and enable remote connection to surfaces not immediately near the location of the device.

19 Claims, 15 Drawing Sheets

OSCILLATING ENERGY CAPTURE MECHANISM

CROSS-REFERENCE TO RELATED APPLICATIONS

This application is a continuation-in-part of application Ser. No. 11/984,850

FEDERALLY SPONSORED RESEARCH

Not applicable

SEQUENCE LISTING OR PROGRAM

Not applicable

BACKGROUND OF THE INVENTION

1. Field of the Invention
This invention relates to the capture of energy from natural sources such as wind and water. 2. Prior Art
US Patent Documents:

| | | |
|---|---|---|
| U.S. Pat. No. 6,914,345 | Jul. 5, 2005 | Webster 290/54. |
| U.S. Pat. No. 4,348,594 | Sep. 7, 1982 | Lipfert 290/54. |
| U.S. Pat. No. 6,153,944 | Nov. 28, 2000 | Clark 290/54. |
| U.S. Pat. No. 4,476,397 | Oct. 9, 1984 | Lawson 290/54. |
| U.S. Pat. No. 6,273,680 | Aug. 14, 2001 | Arnold 416/1 |
| U.S. Pat. No. 6,217,284 | Apr. 17, 2001 | Lawrence 416/83 |
| U.S. Pat. No. 7,045,912 | May 16, 2006 | Leijon et al. 290/42 |
| U.S. Pat. No. 4,228,360 | Oct. 14, 1980 | Navarro 290/43 |
| U.S. Pat. No. 2,604,882 | July 1952 | Schnacke 123/185.4 |
| U.S. Pat. No. 6,581,562 | Jun. 24, 2003 | Goebel, et al. 123/185.3 |
| U.S. Pat. No. 6,726,440 | Mar. 22, 2002 | Pollard 415/41 |
| U.S. Pat. No. 4,595,336 | Jun. 17, 1986 | Gross 416/82 |
| U.S. Pat. No. 6,652,232 | Jan. 3, 2002 | Maxime Lambert Bolduc 416/24 |

Foreign Patent Documents:

| | | |
|---|---|---|
| DE3130002 | Mar. 3, 1983 | Braun F03D5/06; F03D5/00 |

Other References:
Oscillating Wing≠Vortex Oscillation Technology, Inc. http://www.vortexosc.com/modules.php?name=Content&pa=showpage&pid=87 3. Objects and Advantages The objects of this invention are:
1. To provide a more cost-effective (over previous inventions) means of capturing the energy in a wind or water flow
2. To maximize energy extraction from wind and water flows This invention has the following advantages:
1. Prior hydro-oriented energy capture devices rely upon rotary turbines, water diversion and damming to generate energy. These devices are very expensive to build and greatly interrupt the aquatic life and natural flows of water bodies. This invention is not visible to the casual passer-by because it is placed under the surface of a flowing water body. It operates without halting the flow of water and aquatic life or unduly affecting surface use of the water body.
2. This invention has the capability to use multiple flexible sheets to capture energy from the full width of a fluid flow.
3. Arrays of this invention can be used in succession along the course of a water body in hydro energy capture applications, distributing power generation along the length of a flowing water body.
4. The operating principle is one of lift and stall, making the capture of energy from a fluid more efficient than drag-type devices.
5. The functional complexity of this invention is simplified over existing tower-based HAWT (Horizontal Axis Wind Turbines) and hydroelectric turbines.
6. The capability of operating in shallow bodies of water (in hydro energy capture applications) conceivably increases the potential sites the invention can be applied to.
7. The flexible sheet is much less likely to harm birds in wind energy applications, and much less likely to harm aquatic life in hydro energy applications.

Other objects and advantages will become apparent from a consideration of the drawings and ensuing description in this application.

SUMMARY

The mechanism is an energy capture device utilizing one or more flexible sheets of material suspended parallel to the flow of a fluid. The flexible sheets are suspended via cable or solid members that are attached to pivots. The pivots are attached to a platform, either stationary or rotary depending on the medium in which the mechanism to operate, and the pivots are interconnected so as to operate in a synchronous fashion upon urging by the flexible sheets.

DRAWINGS-FIGURES

| Figure | Figure Description |
|---|---|
| FIG. 1 | shows a Perspective view of an embodiment utilizing synchronized pivots with fixed location |
| FIG. 2 | shows a side view of the oscillating energy capture mechanism of FIG. 1, situated in a water flow |
| FIG. 3 | shows a top view of the oscillating energy capture mechanism of FIG. 1 |
| FIG. 4 | shows a perspective view of an embodiment with two flexible sheets |
| FIG. 5 | shows an end view of an embodiment suspended in water flow |
| FIG. 6 | shows a top view of the oscillating energy capture mechanism of FIG. 5 |
| FIG. 7 | shows a side view of pivot of oscillating energy capture mechanism of FIG. 5 |
| FIG. 8 | shows a perspective view of an embodiment with a rigid frame |
| FIG. 9 | shows a side view of pivot of oscillating energy capture mechanism of FIG. 8 |

DRAWINGS-FIGURES

| Figure | Figure Description |
| --- | --- |
| FIG. 10 | shows a perspective view of an embodiment with a rigid frame and floats |
| FIG. 11 | shows a perspective view of an embodiment with a rotary platform |
| FIG. 12 | shows a top view of the Energy Capture Mechanism Cycle (1 of 8) |
| FIG. 13 | shows a top view of the Energy Capture Mechanism Cycle (2 of 8) |
| FIG. 14 | shows a top view of the Energy Capture Mechanism Cycle (3 of 8) |
| FIG. 15 | shows a top view of the Energy Capture Mechanism Cycle (4 of 8) |
| FIG. 16 | shows a top view of the Energy Capture Mechanism Cycle (5 of 8) |
| FIG. 17 | shows a top view of the Energy Capture Mechanism Cycle (6 of 8) |
| FIG. 18 | shows a top view of the Energy Capture Mechanism Cycle (7 of 8) |
| FIG. 19 | shows a top view of the Energy Capture Mechanism Cycle (8 of 8) |

DRAWINGS-REFERENCE NUMERALS

| Reference Numeral | Reference Name |
| --- | --- |
| 188 | Flexible Sheet |
| 188a | Flexible Sheet Side |
| 188b | Flexible Sheet Side |
| 190 | Pivot |
| 190a | Pivot (Upstream) |
| 190b | Pivot (Downstream) |
| 192 | Pivot Mounting Base |
| 194 | Pivot Pole |
| 196 | Flexible Sheet Carrier |
| 198 | Pivot Arm |
| 200 | Suspending Member |
| 202 | Suspension Pivot Arm |
| 204 | Connection Pivot Arm |
| 206 | Connecting Member |
| 208 | Energy Output Shaft |
| 210 | Ground |
| 212 | Fluid Flow |
| 214 | Reference Plane |
| 216 | Energy Conversion Device Support |
| 218 | Bearing |
| 220 | Anchor |
| 222 | Anchor Member |
| 224 | Energy Conversion Device |
| 226 | Rotational Hanger |
| 228 | Frame Member |
| 230 | Floatation Frame Member |
| 232 | Rotary Base |
| 234 | Frame Rotation Wheel |

DETAILED DESCRIPTION

Preferred Embodiment—FIGS. 1, 2, 3

The perspective view in FIG. 1 shows the invention as utilized within a fluid flow such as a stream, river or other current. Multiple Pivot Mounting Bases 192 are affixed to the ground beneath a fluid flow such as a stream, river or other current. The Pivot Mounting Bases 192 may also be attached to a singular vane-type structure in wind-oriented applications.

Pivot Poles 194 are attached to each respective Pivot Mounting Base 192 via a circular Bearing 218 as shown in the side view in FIG. 2. The Pivot Poles 194 are attached perpendicular to the Reference Plane 214 as shown in FIG. 1.

Each Pivot 190 is composed of a Pivot Pole 194 that has attached to it multiple Suspension Pivot Arms 202 and Connection Pivot Arms 204. The Suspension Pivot Arms 202 and Connection Pivot Arms 204 provide connection points for Suspending Members 200 and Connecting Members 206 as shown in FIG. 1

The Connection Pivot Arms 204 on each Pivot 190 are connected to Connection Pivot Arms 204 on adjacent Pivots 190 via Connecting Members 206, creating a tensile connection between all Pivots 190.

The Suspension Pivot Arms 202 of a Pivot (Upstream) 190a are connected to the corresponding Suspension Pivot Arms 202 of another Pivot (Upstream) 190a via Suspending Members 200, forming an upper and lower support tensile structure that enables single or multiple Flexible Sheets 188 to be supported at the upstream location via a Flexible Sheet Carrier 196.

The Suspension Pivot Arms 202 of one Pivot (Downstream) 190b are connected to the corresponding Suspension Pivot Arms 202 of another Pivot (Downstream) 190b via Suspending Members 200, forming an upper and lower support tensile structure that enables single or multiple Flexible Sheets 188 to be supported at the downstream location via a Flexible Sheet Carrier 196.

The Suspending Members 200 support single or multiple Flexible Sheets 188 via Flexible Sheet Carriers 196 affixed at the Suspending Members (Upstream) 200a and Suspending Members (Downstream) locations that in turn attach to Flexible Sheets 188.

Internal to single or multiple Pivot Poles 194 are fixed Energy Conversion Device Supports 216 that are affixed to their respective Pivot Mounting Bases 192, with a singular example being shown in FIGS. 1 and 2. Each Energy Conversion Device Support 216 is attached to an Energy Conversion Device 224 as shown in FIG. 2. In this embodiment, the Pivot Pole 194 is lengthened so as to protrude above the surface of the fluid flow forming what is then termed an Energy Output Shaft 208 as shown in FIGS. 1 and 2. The Energy Output Shaft 208 attaches to an Energy Conversion Device 224 as shown in FIG. 2. The Energy Conversion Device 224 may also be located within or below the Fluid Flow 212.

The side view in FIG. 2 shows the invention attached to the Ground 210 that forms the foundation. The invention itself is situated within the Fluid Flow 212. The Reference Plane 214 is shown as the surface of the Ground 210 at the location of the Pivot Mounting Bases 192.

Embedded in the Ground 210 are multiple Pivot Mounting Bases 192. Pivots (Upstream) 190a and Pivots (Downstream) 190b are attached to these Pivot Mounting Bases 192 via circular Bearings 218. In this view, only one of each Pivot position (Upstream and downstream) is visible.

The Pivot (Upstream) 190a and Pivot (Downstream) 190b are situated fore and aft of the Flexible Sheet Carriers 196 which in turn attach to single or multiple Flexible Sheets 188. In this view, only one Flexible Sheet 188 and its corresponding Flexible Sheet Carriers 196 is visible.

The Pivot (Downstream) 190b in this view shows the fixed Energy Conversion Device Support 216 embedded into a Pivot Mounting Base 192. The Energy Output Shaft 208 forms an outer shell about the Energy Conversion Device Support 216 and is supported via a circular Bearing 218 above the Fluid Flow 212 surface in addition to the circular Bearing 218 at the Pivot Mounting Base 192.

The top view in FIG. 3 shows the Pivot Poles 194 with their affixed Connection Pivot Arms 204 and Suspension Pivot Arms 202. The Connecting Members 206 are strung between the attachment points of the Connection Pivot Arms 204. The Suspending Members 200 are strung between the attachment points of the Suspension Pivot Arms 202.

The Flexible Sheet Carriers 196 are attached to the Suspending Members 200. In this view a single Flexible Sheet 188 is attached to the Flexible Sheet Carriers 196.

FIG. 3 also shows the Energy Conversion Device Support 216 centered within the Energy Output Shaft 208.

OPERATION

Preferred Embodiment—FIGS. 1, 12-19

In the embodiment shown in FIGS. 1 and 2, a Fluid Flow 212 approaches the upstream end of a single Flexible Sheet 188, and strikes the leading edge of the upstream Flexible Sheet Carrier 196 which splits the Fluid Flow 212 at this point into Flexible Sheet Side 188a and Flexible Sheet Side 188b. The Pivots 190 (See FIG. 1) are fixed perpendicular to their respective Pivot Mounting Bases 192, and are free to pivot about their longitudinal axis via a Bearing 218 assembly. The Pivots 190 (See FIG. 1) are synchronized in their rotational pivoting motion via the Connecting Members 206 that create a tensile connection around the perimeter of the invention.

FIGS. 12-19 show a sequence of time steps as the Fluid Flow 212 flows through the embodiment.

As shown in FIG. 12, the curvature of the Flexible Sheet 188 forces the Fluid Flow 212 into separate positive (as indicated by the "+" symbols) and negative (as indicated by the "−" symbols) pressure areas on each side of the Flexible Sheet 188, depending upon the angle of attack presented by the Flexible Sheet 188.

The lift generated by the negative pressure on the Flexible Sheet Side 188a causes the shape to become convex on the Flexible Sheet Side 188a, at which point the lift generated is focused at the downstream end of the Flexible Sheet Side 188a as shown in FIG. 13. This lift force is then transmitted into the downstream Flexible Sheet Carrier 196 which in turn pulls the downstream Suspending Members 200 in the direction of the lift force.

This pulling force in turn causes the downstream Suspension Pivot Arms 202 to also move in the direction of the lift force. Because of the tensile connection formed by the Connecting Members 206 between all four Pivots 190 in this embodiment (As shown in FIG. 1), the upstream Suspension Pivot Arms 202 move in the opposite direction to the downstream Suspension Pivot Arms 202.

As shown in FIG. 14, the motion generated by the lift continues as in FIG. 13 until the relative position of the upstream end of the Flexible Sheet 188 and the downstream end of the Flexible Sheet 188 begin to create a concave pocket on the Flexible Sheet Side 188b.

In FIGS. 15 and 16, the lift being generated by the negative pressure at the downstream end of the Flexible Sheet Side 188a is still strong enough to continue pulling in the direction established in FIGS. 13 and 14. However, the upstream end of the Flexible Sheet 188 is now moving into a position where a large negative pressure area is forming on the Flexible Sheet Side 188b near the upstream end. In FIG. 16, the negative pressure on the Flexible Sheet Side 188b, midway along, is set to overcome the negative pressure being generated on the Flexible Sheet Side 188a.

This causes the Flexible Sheet 188 to reverse shape as shown in FIG. 17, creating a focused negative pressure area near the downstream end of the Flexible Sheet Side 188b. This transmits force into the downstream Flexible Sheet Carrier 196 toward the Flexible Sheet Side 188b, which in turn transmits the force into the downstream Suspension Members 200 and downstream Suspension Pivot Arms 202. This reverses the motion of all four Pivots 190 via the Connecting Members 206.

The pivoting motion is transmitted into the Energy Output Shaft 208, at which time it is converted into electrical, mechanical or other forms of energy.

DETAILED DESCRIPTION

Figure 4:
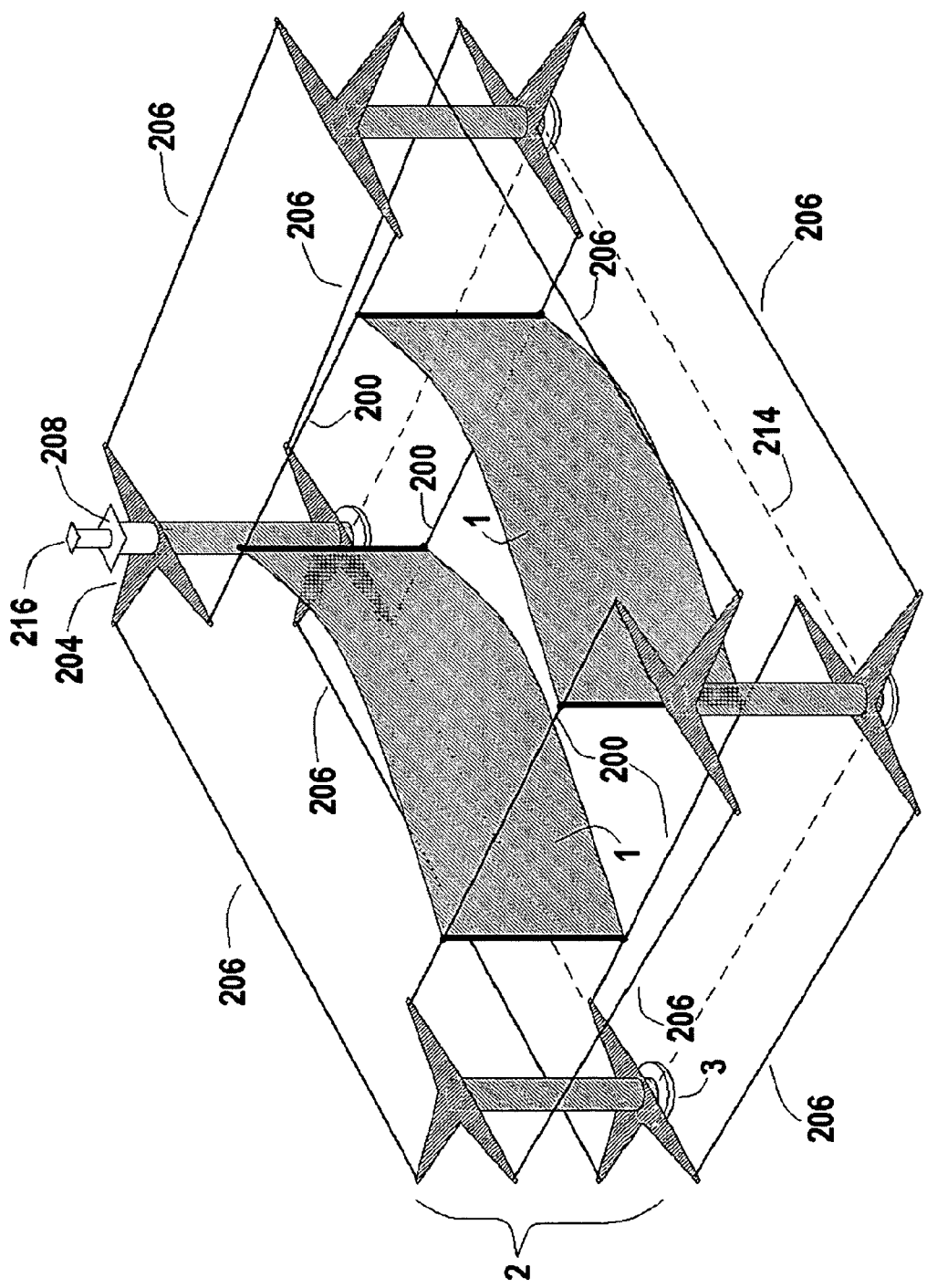

Alternate Embodiment—FIG. 4

The perspective view in FIG. 4 shows an embodiment with two Flexible Sheets 188 spaced along the Suspending Members 200. This embodiment is composed of the same elements as described in the "DETAILED DESCRIPTION—PREFERRED EMBODIMENT—FIGS. 1, 2, 3" section, with the addition of a second Flexible Sheet 188, attached via a second set of Flexible Sheet Carriers 196.

OPERATION

Alternate Embodiment—FIG. 4

The operation of this embodiment is identical to that described in the "OPERATION—PREFERRED EMBODIMENT-FIGS. 1, 12-19" section, with the addition of a second Flexible Sheet 188 spaced at an adequate distance so as to generate optimal lift without interfering with the lift generated by the first Flexible Sheet 188. This enables the Flexible Sheets 188 to move in synchronous fashion in terms of their contours, so as to generate optimal energy output.

DETAILED DESCRIPTION

Figure 5:
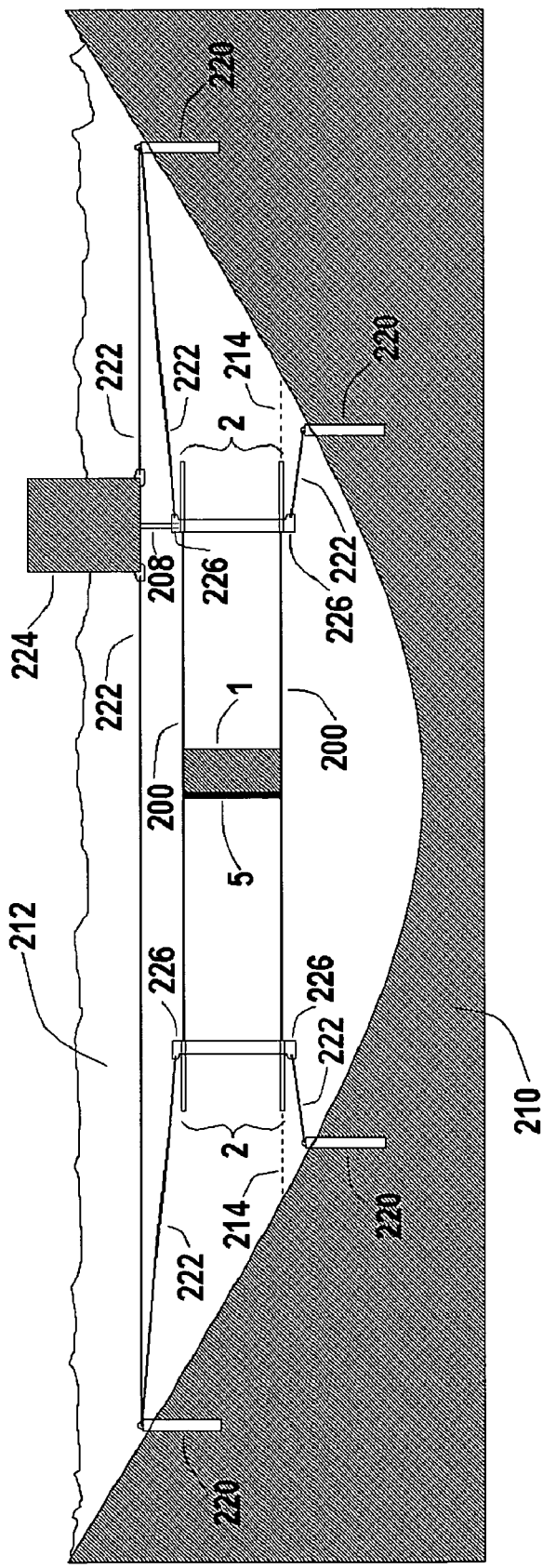
Figure 6:
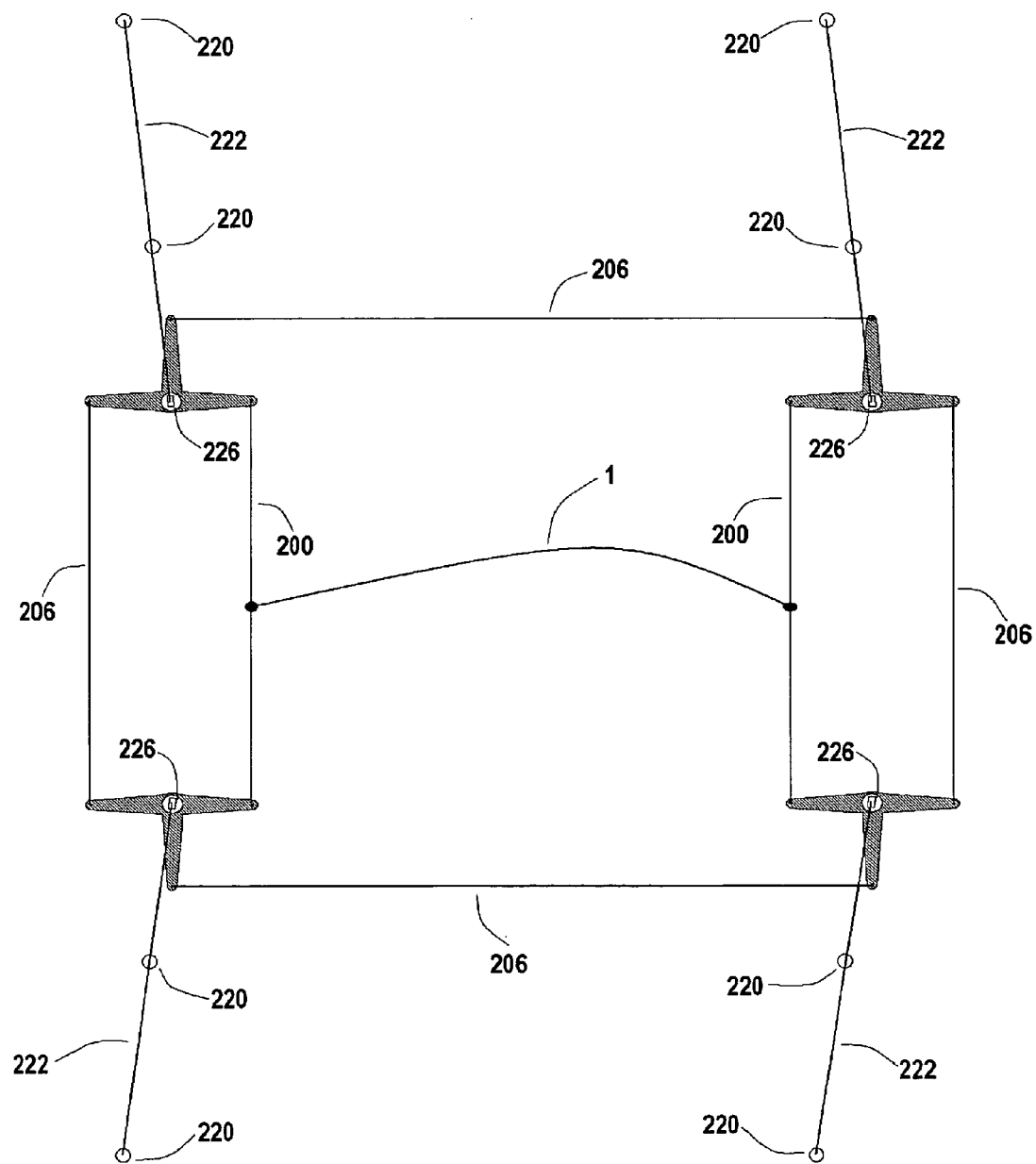
Figure 7:
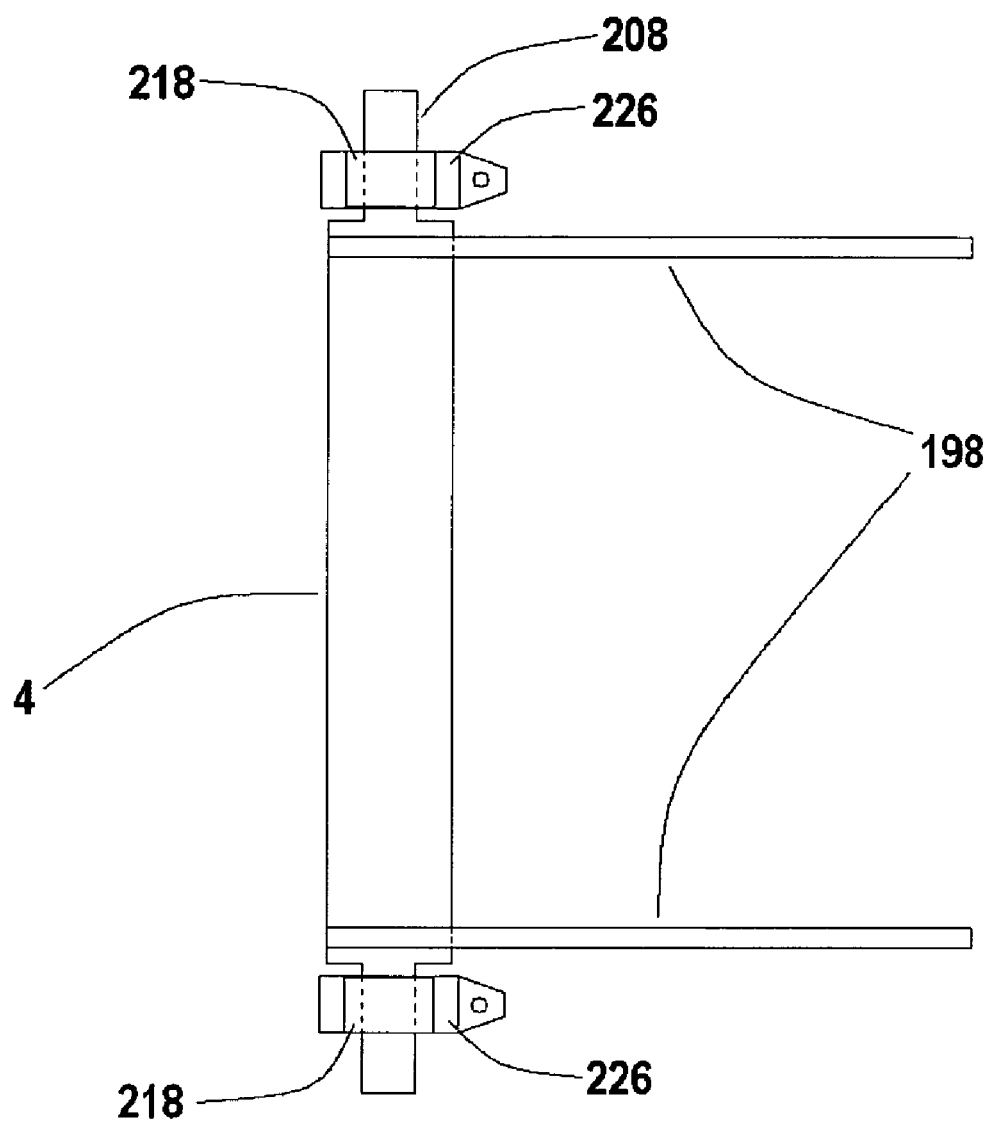

Alternate Embodiment—FIGS. 5, 6, 7

Figure 1:
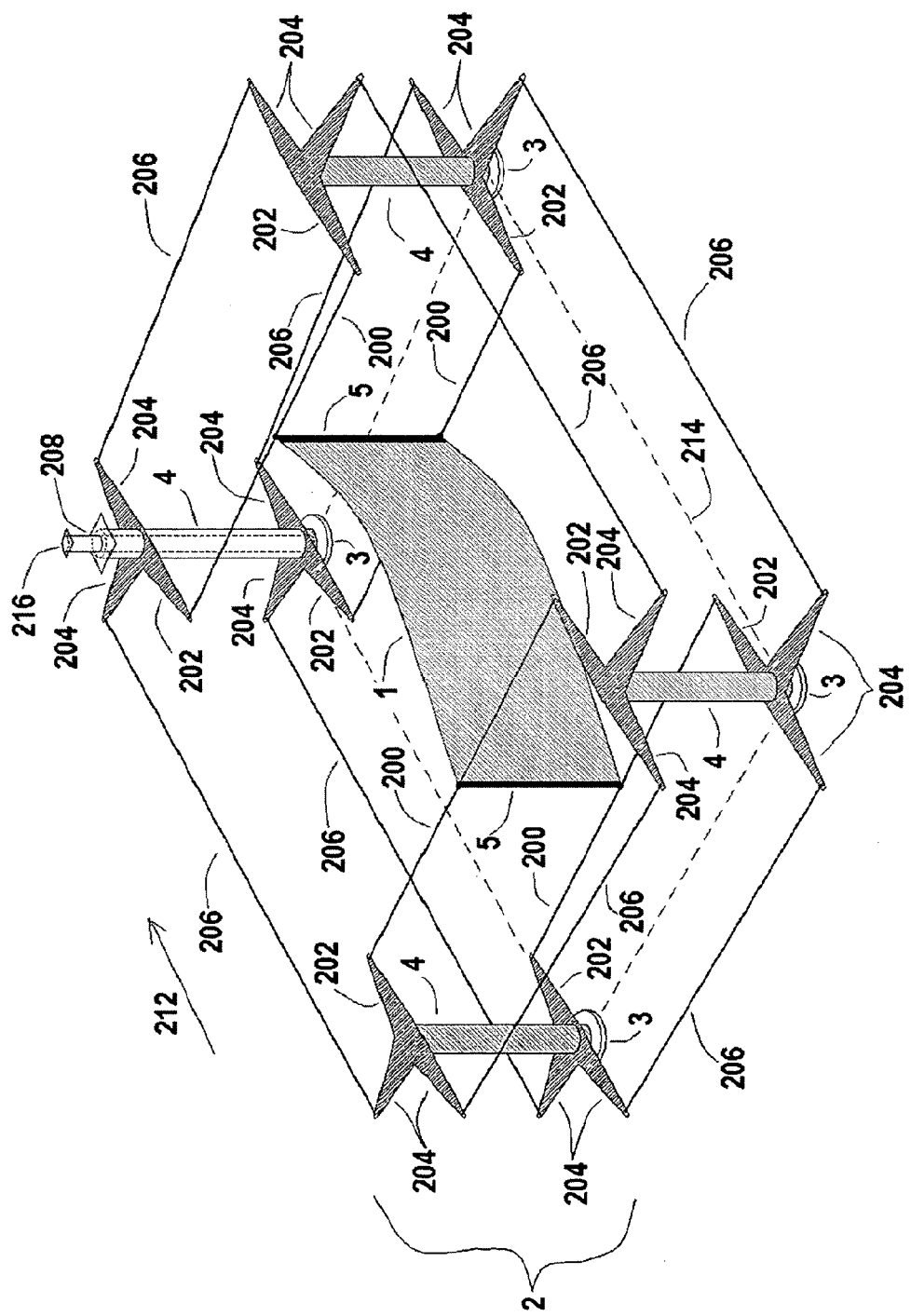
Figure 2:
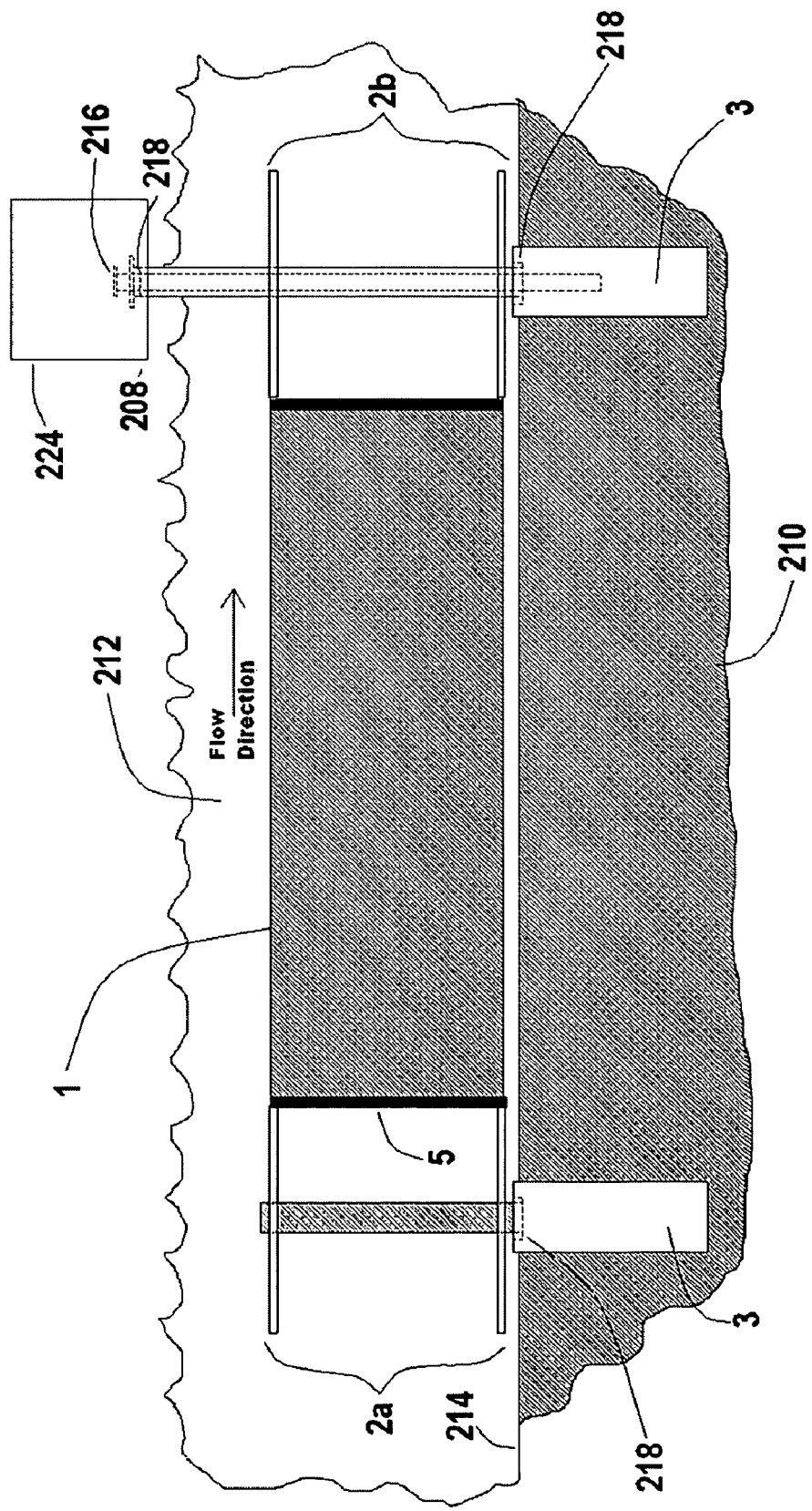
Figure 3:
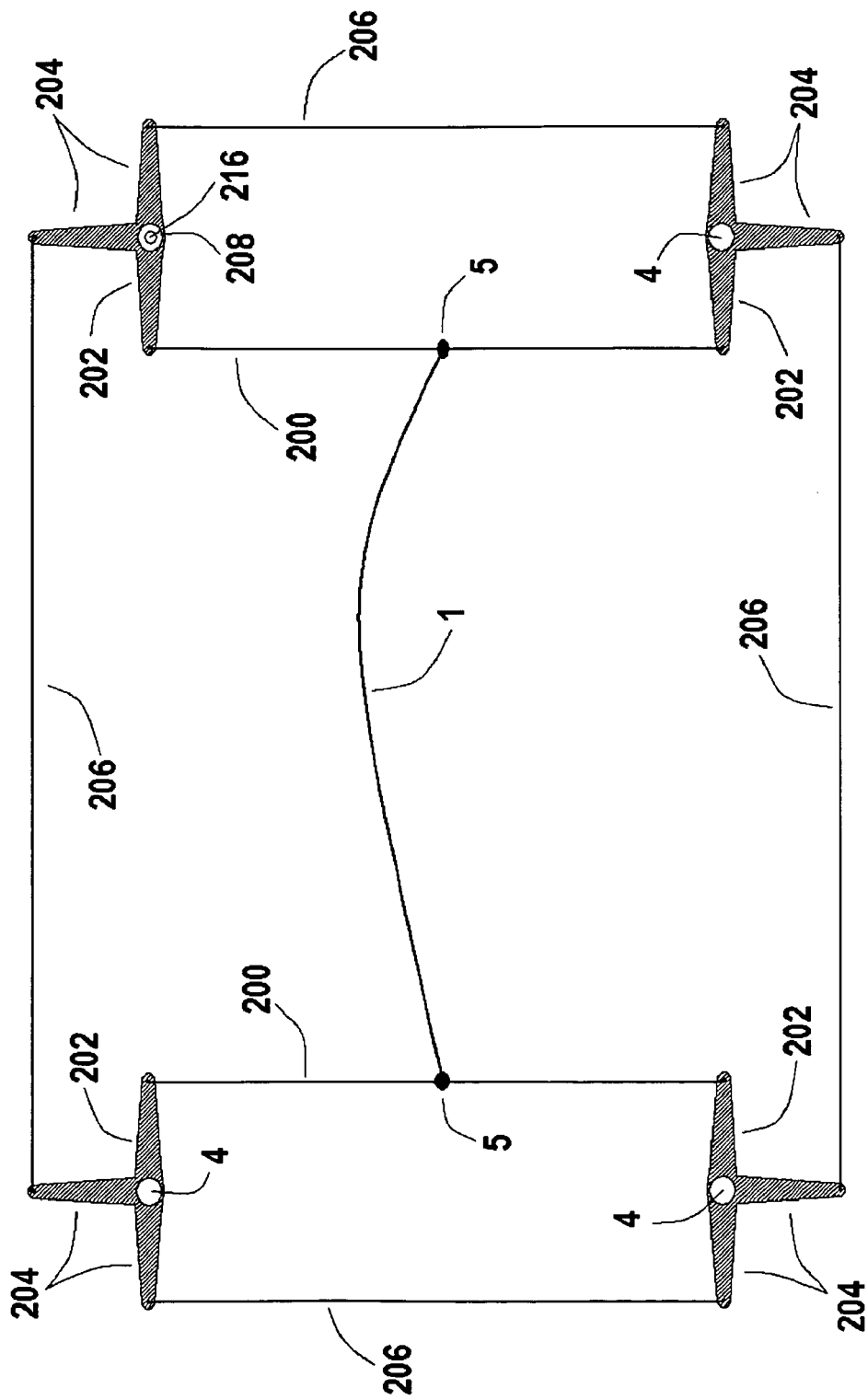

The alternate embodiment in FIG. 5 is composed of the same components and interconnections as described in the "DETAILED DESCRIPTION—PREFERRED EMBODIMENT—FIGS. 1, 2, 3" section, with the following exceptions:

As shown in the end view of the alternate embodiment in FIG. 5 it does not make use of Pivot Mounting Bases 192 (See FIG. 1) but instead attaches the Pivot Poles 194 to Rotational Hangers 226. As shown in FIG. 7, one Rotational Hanger 226 is attached via a Bearing 218 at one end of a Pivot Pole 194 and another Rotational Hanger 226 is attached via a Bearing 218 at the other end of the same Pivot Pole 194. In FIG. 5, The Rotational Hangers 226 are connected via Anchor Members 222 to Anchors 220 embedded into the Ground 210 of a riverbed, streambed or other flowing water body bottom or shoreline. The Pivots 190 are aligned on a Reference Plane 214 independent of the Anchor 220 locations.

An Energy Output Shaft 208 passes through a Rotational Hanger 226 on one end of a selected Pivot Pole 194 and into an Energy Conversion Device 224.

Anchor Members 222 suspend the Energy Conversion Device 224 above the Fluid Flow 212 by connecting to the Energy Conversion Device 224 housing and to the Anchors 220. In addition the Energy Conversion Device 224 could be supported by the Rotational Hanger 226 that the Energy Output Shaft 208 passes through.

FIG. 6 shows this embodiment from a top view. The Anchors 220 attach to the Rotational Hangers 226 via the Anchor Members 222.

FIG. 7 shows a side view of the Pivot 190 mechanism used in this embodiment. A Pivot Pole 194 with shaft extensions at each end and attached Pivot Arms 198 is coupled with the Rotational Hangers 226, one at each end. A Bearing 218 is used to enable the Pivot Pole 194 and Pivot Arms 198 to rotate freely according to their constraints while the Rotational Hangers 226 are held stationary.

OPERATION

Alternate Embodiment—FIGS. 5, 6, 7

The operation of this embodiment is identical to that described in the "OPERATION—PREFERRED EMBODIMENT—FIGS. 1, 12-19" section, with the following exceptions:

The Pivots 190 are free to rotate within the constraints of the other components via their Bearing 218 connections to the Rotational Hangers 226. The Rotational Hangers 226 are held stationary by their connections to the Anchor Members 222 and by extension their respective Anchors 220. This structure provides the same support to the Pivots 190 as the Pivot Mounting Bases 192 of the preferred embodiment.

DETAILED DESCRIPTION

Figure 8:
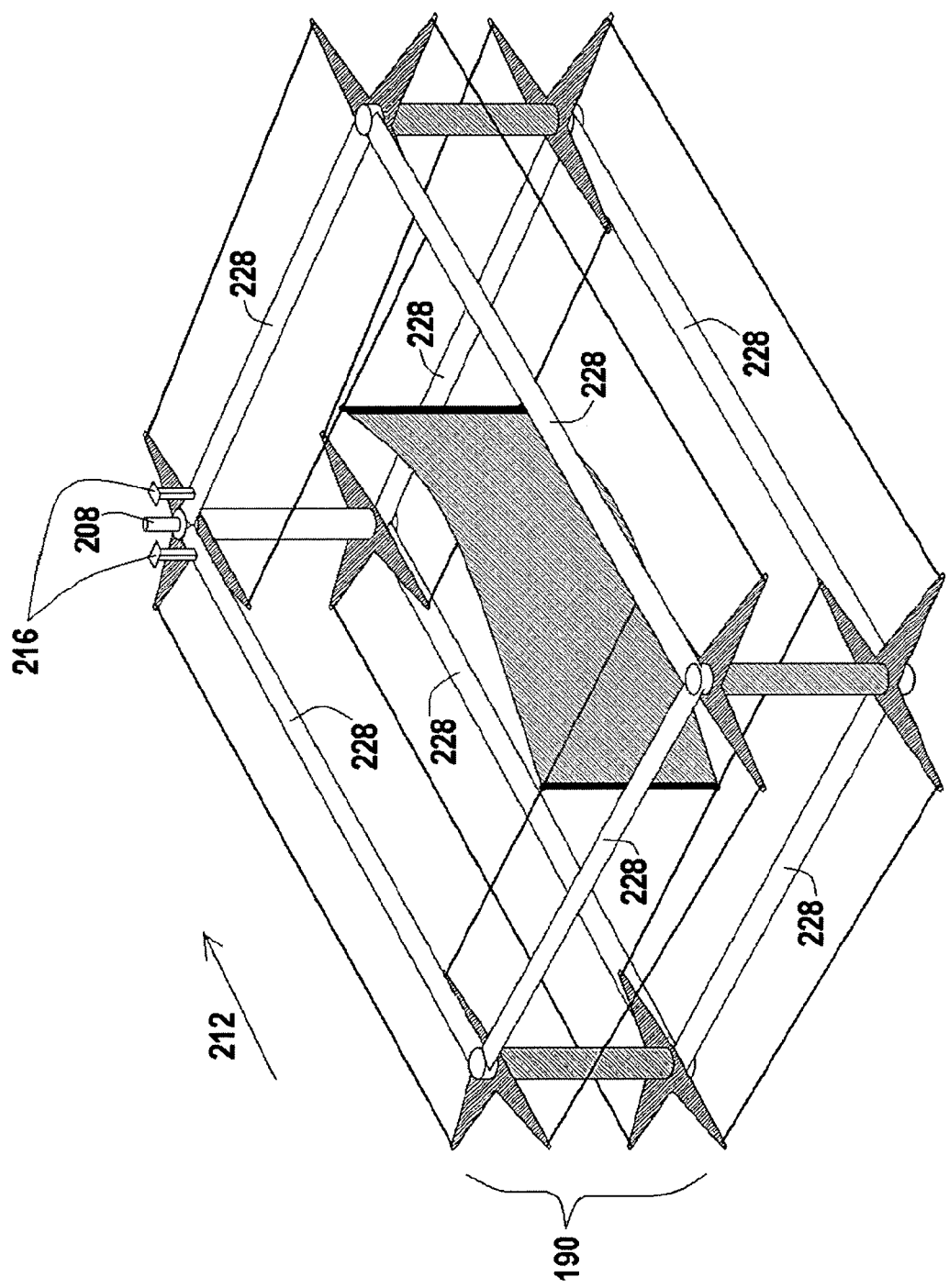
Figure 9:
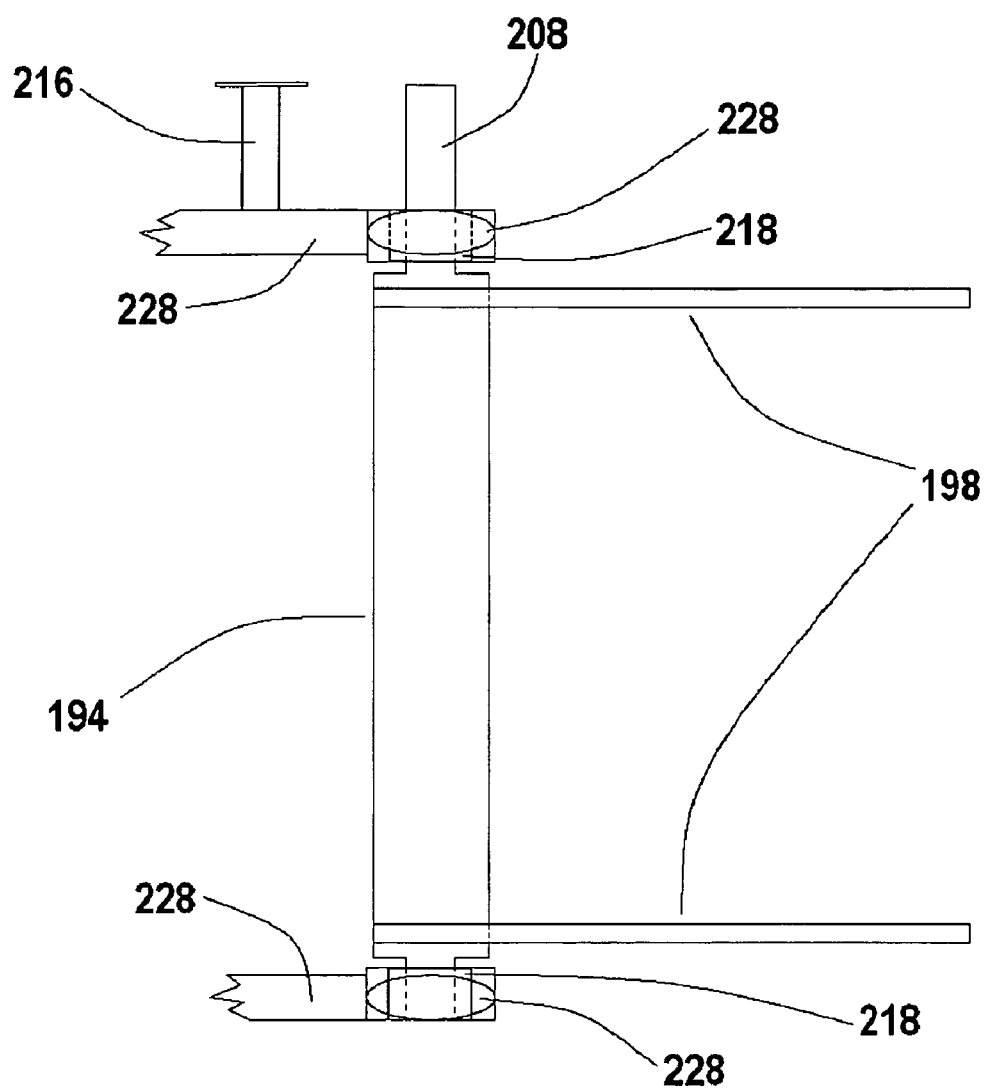

Alternate Embodiment—FIGS. 8, 9

The perspective view in FIG. 8 shows an embodiment with multiple Frame Members 228 connecting the Pivots 190 to form a rigid frame structure. This embodiment is composed of the same elements as described in the "DETAILED DESCRIPTION—PREFERRED EMBODIMENT—FIGS. 1, 2, 3" section, with the following exceptions:

As shown in FIG. 8 this embodiment does not make use of Pivot Mounting Bases 192 (See FIG. 1) but instead attaches the Pivot Poles 194 to rigid intersections of the Frame Members 228.

FIG. 9 shows a detailed side view of a Pivot 190 of FIG. 8. The intersections of the Frame Members 228 are located at both ends of the Pivot Pole 194. The Pivot Poles 194 have shaft-like extensions that are passed through the intersections and supported via Bearings 218. An Energy Conversion Device Support 216 is shown mounted to one of the Frame Members 228.

Shown in FIG. 8 and FIG. 9 is a Pivot 190 having a further extension at one end of the Pivot Pole 194 that forms an Energy Output Shaft 208.

OPERATION

Alternate Embodiment—FIGS. 8, 9

The operation of this embodiment is identical to that described in "OPERATION—PREFERRED EMBODIMENT—FIGS. 1, 12-19" section, with the following exceptions:

The Pivots 190 are free to rotate within the constraints of the components they are connected to via their Bearing 218 connections to the intersections of the Frame Members 228.

DETAILED DESCRIPTION

Figure 10:
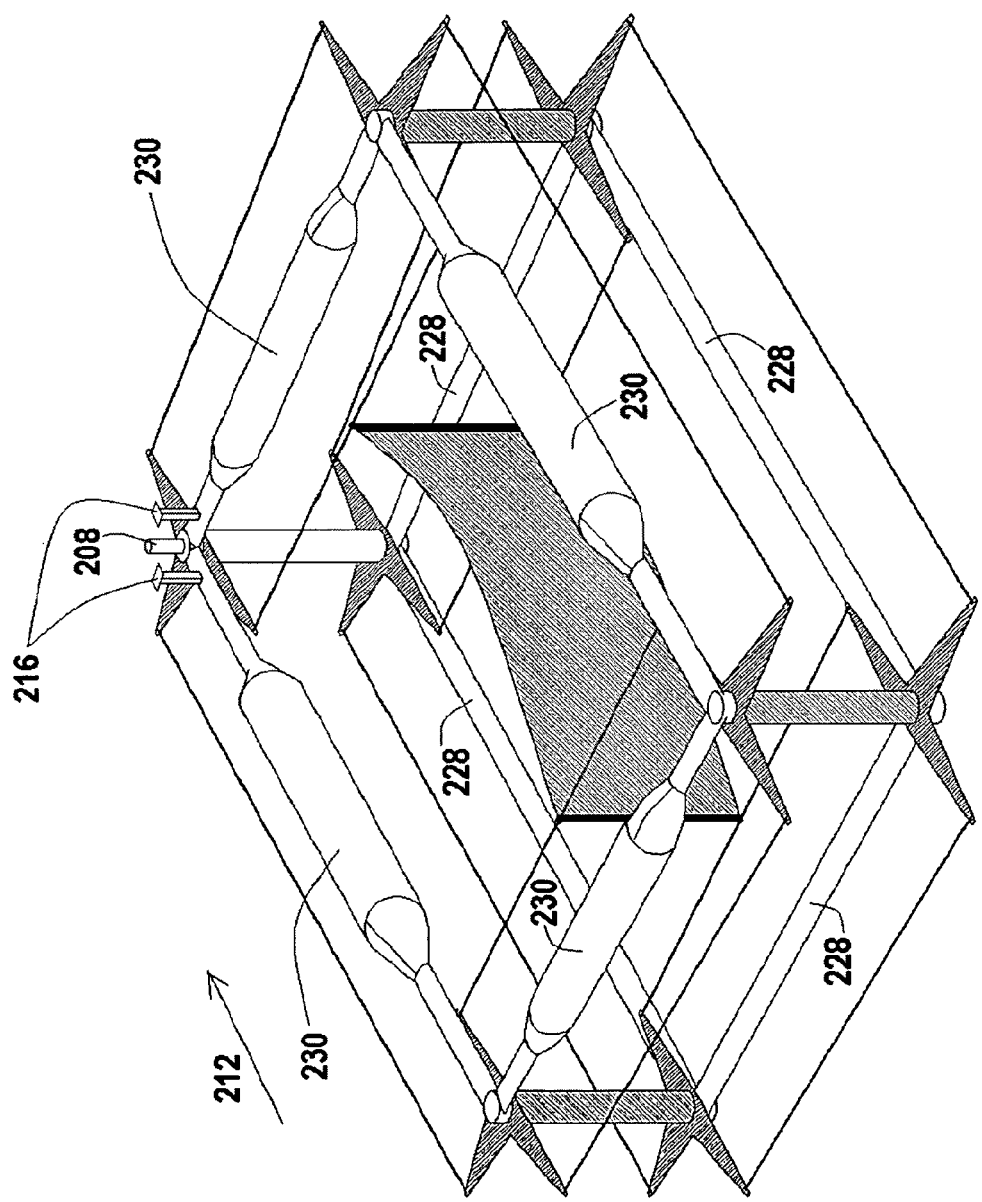

Alternate Embodiment—FIG. 10

The perspective view in FIG. 10 shows an embodiment with multiple Frame Members 228 and multiple Floatation Frame Members 230 connecting the Pivots 190 to form a rigid frame structure. This embodiment is composed of the same elements as the alternate embodiment as described in the "DETAILED DESCRIPTION—ALTERNATE EMBODIMENT—FIGS. 8, 9" section, with the following exceptions:

As shown in FIG. 10, the Floatation Frame Members 230 form a box shape connecting the Pivots 190 at the top of the structure, while the Frame Members 228 form a box shape connecting the Pivots 190 at the bottom of the structure.

OPERATION

Alternate Embodiment—FIG. 10

The operation of this embodiment is identical to that described in "OPERATION—PREFERRED EMBODIMENT—FIGS. 1, 12-19" section, with the following exceptions:

The Pivots 190 are free to rotate within the constraints of the components they are connected to via their Bearing 218 connections to the intersections of the Frame Members 228 and intersections of the Floatation Frame Members 230. This embodiment would operate with buoyancy, and could alternately substitute Floatation Frame Members 230 for the Frame Members 228 to increase buoyancy.

DETAILED DESCRIPTION

Figure 11:
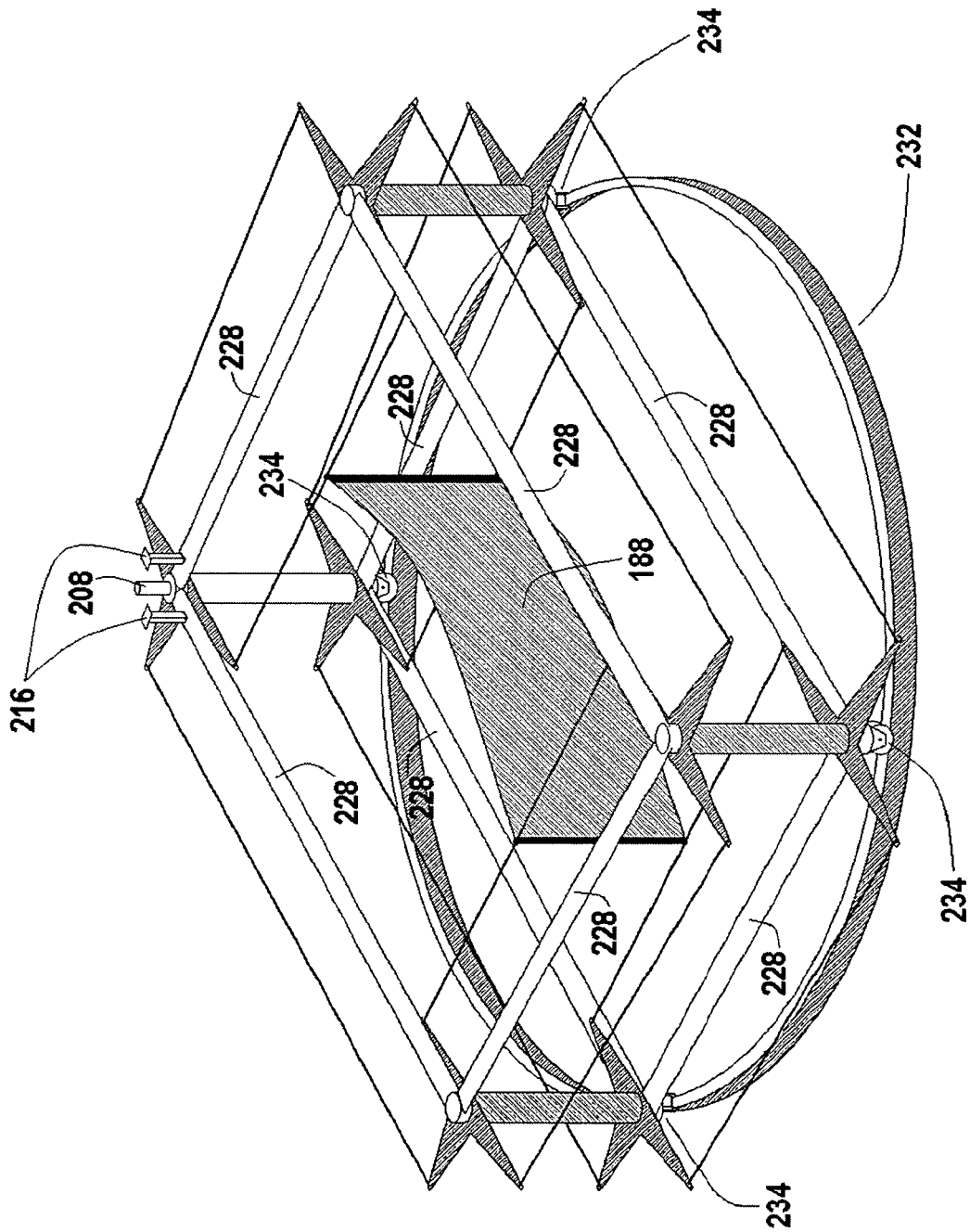
Figure 12:
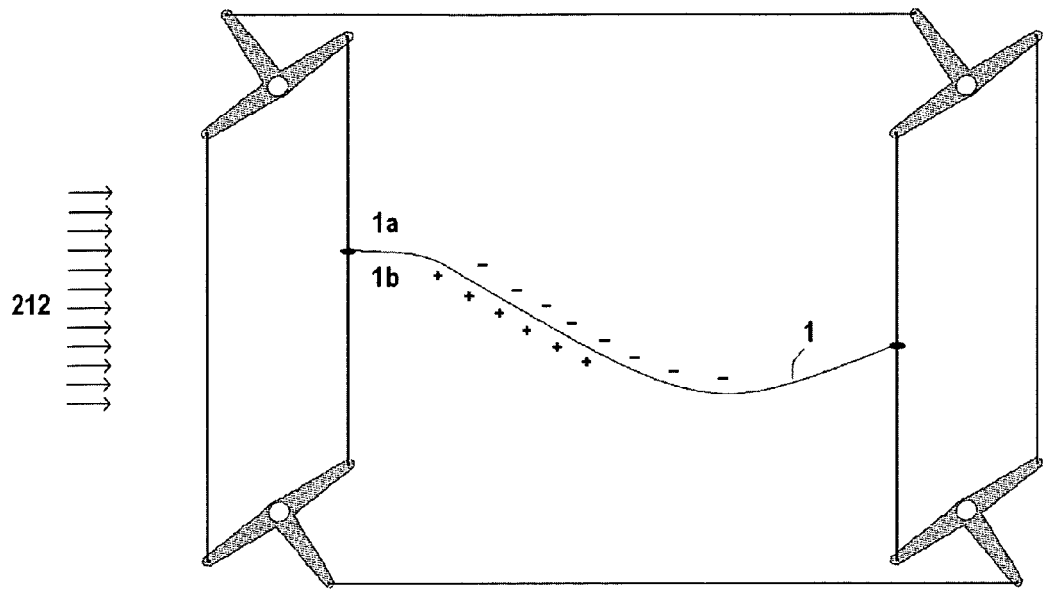
Figure 13:
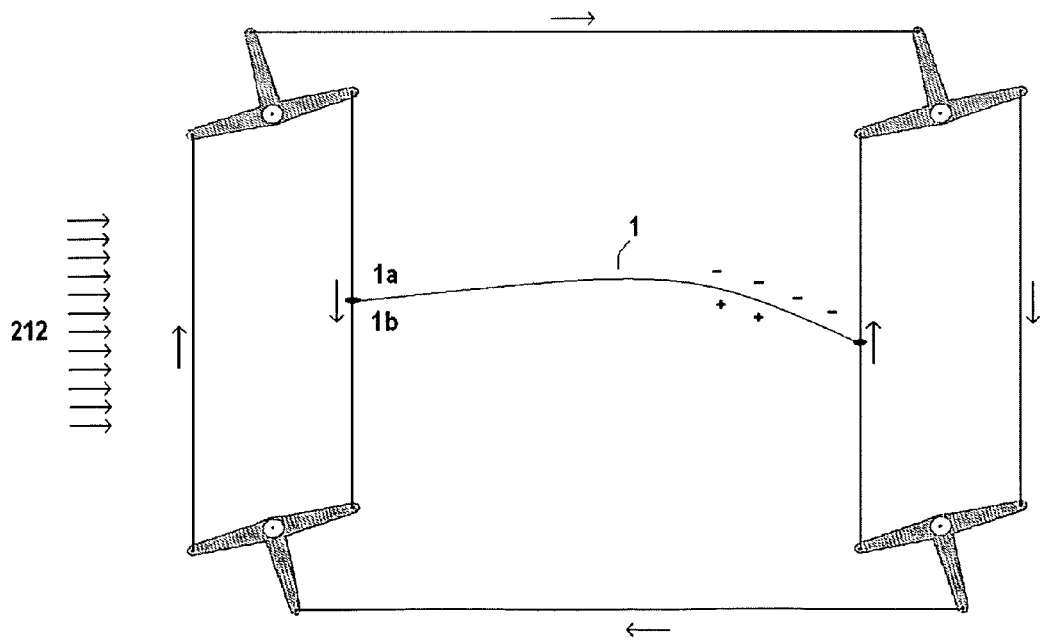
Figure 14:
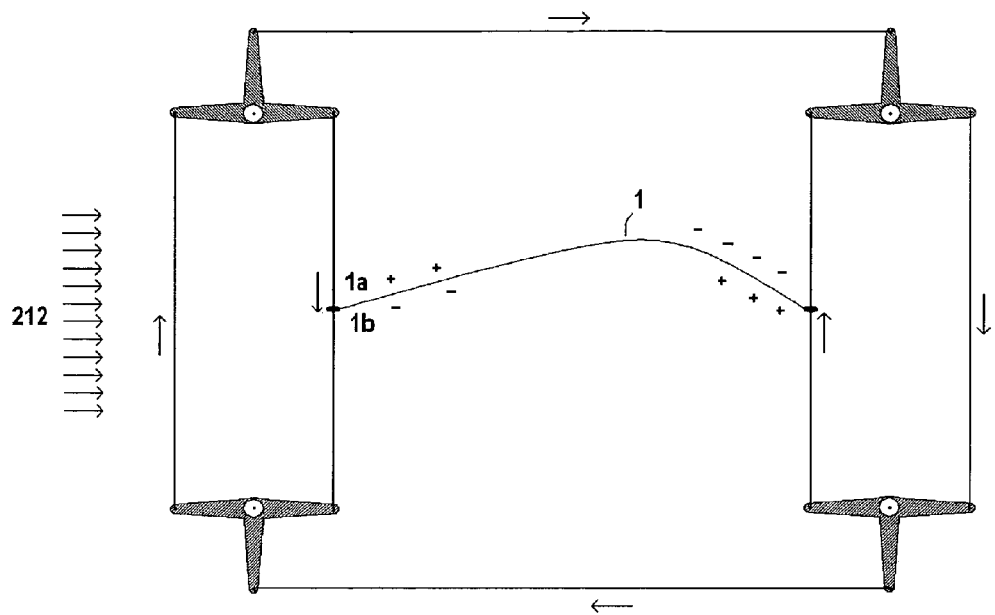
Figure 15:
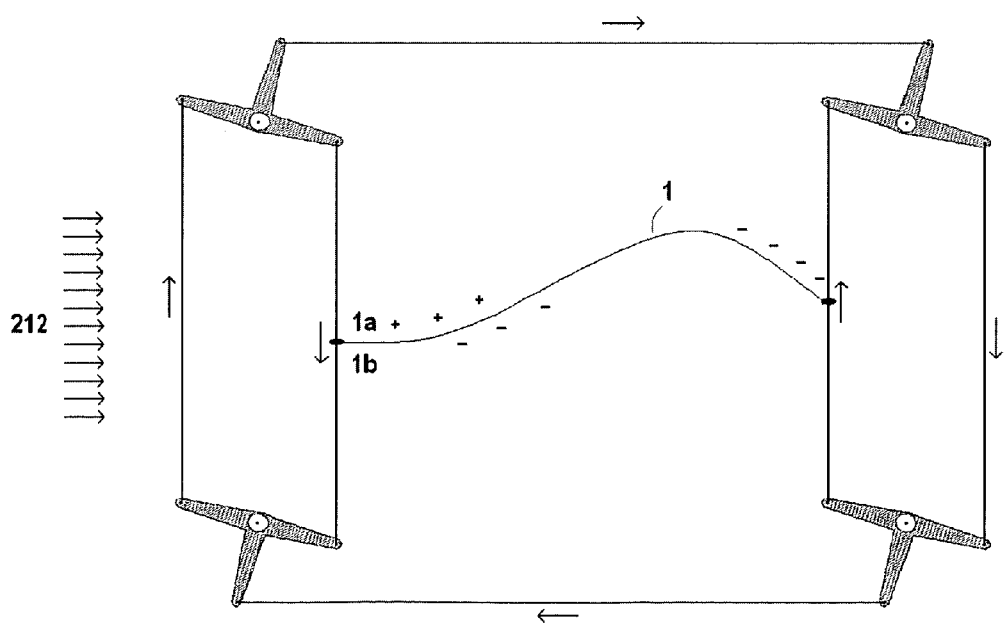
Figure 16:
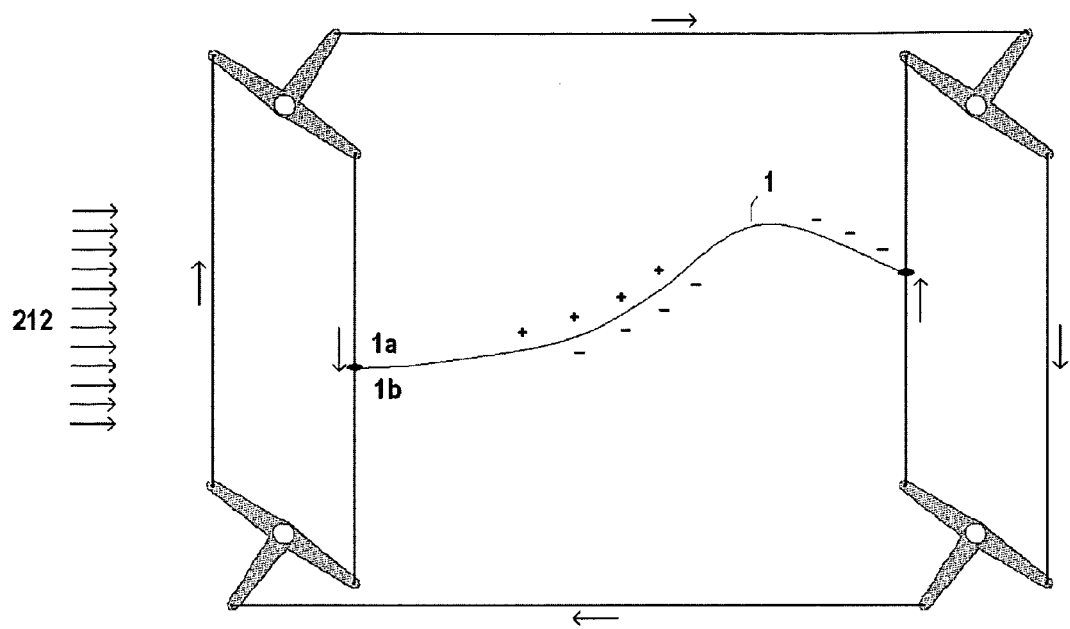
Figure 17:
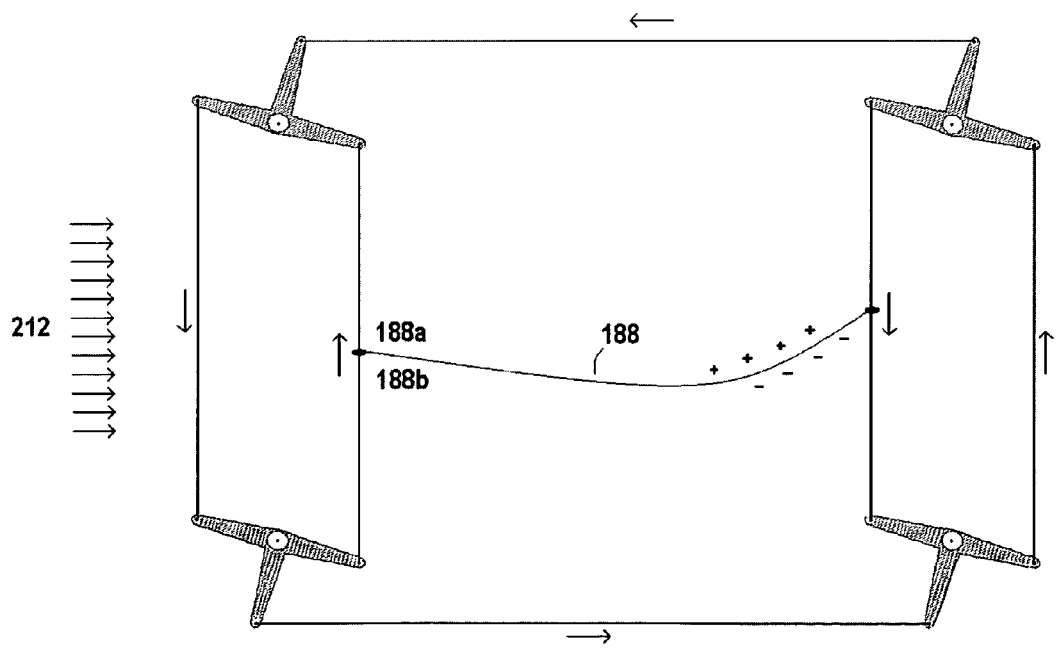
Figure 18:
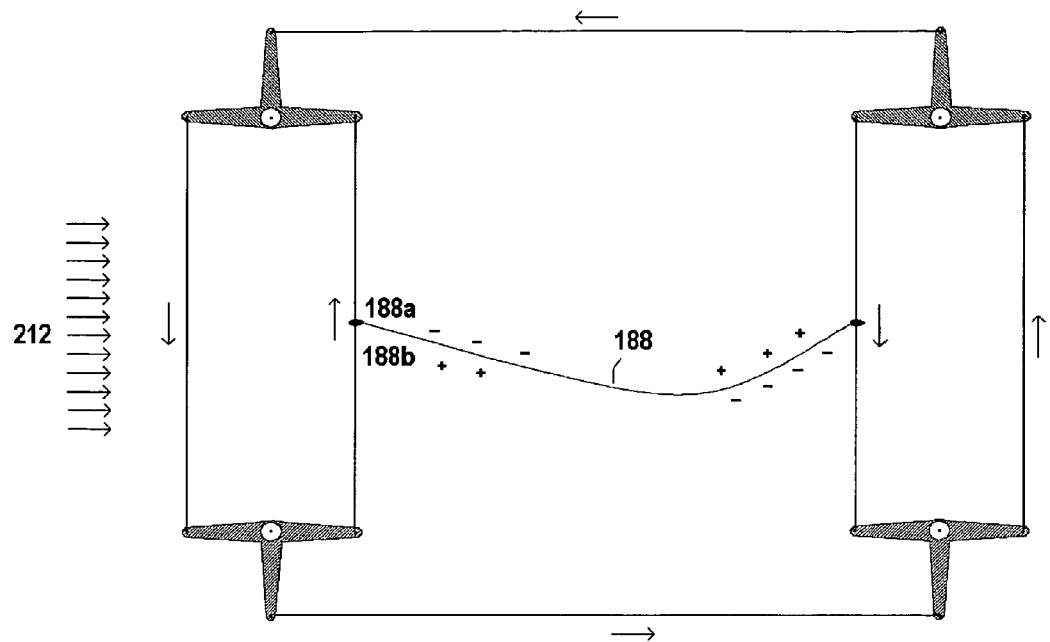
FIG. 18 shows the continued motion toward in the direction of the Flexible Sheet Side 188b.
Figure 19:
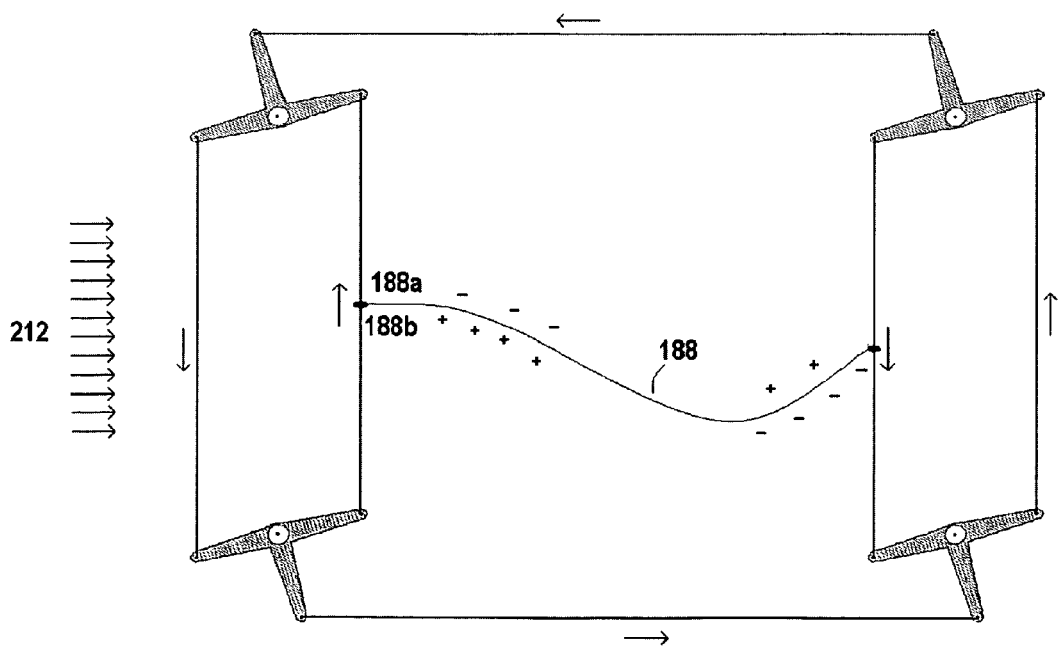
FIG. 19 shows the downstream end of the Flexible Sheet Side 188b near its maximum lift extent prior to the pivoting cycle beginning again as shown in FIG. 12 due to the increasing negative pressure on the upstream Flexible Sheet Side 188a side.

Alternate Embodiment—FIG. 11

The perspective view in FIG. 11 shows an embodiment with a rigid structure composed of Frame Members 228 that is supported via Frame Rotation Wheels 234 riding on a Rotary Base 232. This embodiment is composed of the same elements as the alternate embodiment as described in the "DETAILED DESCRIPTION—ALTERNATE EMBODIMENT—FIGS. 8, 9" section, with the following exceptions:

As shown in FIG. 11, the Pivots 190 have attached Frame Rotation Wheels to one end, which ride atop a circular Rotary Base 232 to enable 360 degree rotation capability.

OPERATION

Alternate Embodiment—FIG. 11

The operation of this embodiment is identical to that described in "OPERATION—PREFERRED EMBODIMENT—FIGS. 1, 12-19" section, with the following exceptions:

The Pivots 190 are free to rotate within the constraints of the components they are connected to via their Bearing 218 connections to the intersections of the Frame Members 228. The rigid structure formed by the Frame Members 228 is rotatable so as to position the Flexible Sheet 188 into a parallel orientation to a fluid flow. The primary application for this embodiment is in fluid flows that change directions.

CONCLUSION, RAMIFICATIONS, AND SCOPE

While the above descriptions contain many specifics, these should not be construed as limitations on the scope of the invention, but rather as an exemplification of embodiments thereof. Many other variations are possible. For example:
1. Scaling of the Flexible sheet to increase energy capture
2. Alternate shapes of pivot structures to optimize fluid flow around them
3. The use of tension/compression and tension-only Connection Members and Support Members.
4. The use of natural and synthetic materials for the Connection Members and Support Members.
5. The use of multiple Energy Output Shafts, attached to separate Pivots, to distribute force to multiple Energy Conversion Devices.
6. The use of tension/compression Anchor Members.
7. Optimizations to riverbeds/streambeds to enhance performance.
8. Optimizations to water courses to enhance performance. (e.g. Narrowing)
9. Addition of the device to high-rise building structures
10. Application of the invention embodiments normally intended for wind to water, and vice versa.
11. Other shapes for the flexible sheet that encourage improved lift generation
12. Other appendages to the structure of the mechanism to encourage fluid flow speed increases past the mechanism.
13. Use of the water-based embodiments in tidal areas of oceans or in areas of strong current movement.
14. Floating the water-based embodiments upon the surface of the water, suspending their energy capture components below the water surface.
15. Refinements to the structure and flexible sheet to improve performance
16. The use of synthetic or natural materials for the flexible sheet, including semi-rigid and rigid materials.
17. The optimization of the layout of the mechanical components such that the disturbances to fluid flow are minimized.
18. The stacking of multiple vertical or horizontal flexible sheets and related structure to enable operation in a deeper/shallower fluid flow
19. Adjustable height flexible sheets and related structure to enable adjustment for fluid flow depth.
20. To optimize the layout of multiple Oscillating Energy Capture Mechanisms as described, to create a greater result than an individual mechanism, or optimized to avoid detrimental effects.
21. The use of synthetic or natural materials for the structure of the mechanism including composites.
22. The use of the flexible sheet as a public advertising or information medium, including the projection of images onto the surface.

Accordingly, the scope of the invention should be determined not by the embodiments illustrated, but by the appended claims and their legal equivalents.

I claim:
1. An energy capture device, comprising
   (a) a plurality of elongated support members, oriented perpendicular to a reference plane and at spaced locations,
   (b) said elongated support members supported by a support structure so as to be able to pivot about said elongated support members longitudinal axis,
   (c) a plurality of connection support members fixably joined to said elongated support members,
   (d) a plurality of connecting members joined to said connection support members so as to form a connection between said connection support members,
   (e) a plurality of sheet support members fixably joined to said elongated support members,
   (f) a plurality of sheet suspension members joined to said sheet support members so as to form a connection between said sheet support members,
   (g) a flexible sheet of material joined to said sheet suspension members.

2. The energy capture device of claim 1 further including a means of controllably coupling pivot motion of said elongated support members to an energy conversion device.

3. The energy capture device of claim 1 further including a plurality of said flexible sheet of material joined to said sheet support members.

4. The energy capture device of claim 1 wherein said support structure is of a rotary type.

5. The energy capture device of claim 4 further including a means of controllably coupling pivot motion of said elongated support members to an energy conversion device.

6. The energy capture device of claim 4 further including a plurality of said flexible sheet of material joined to said sheet support members.

7. The energy capture device of claim 1 wherein said support structure is of a fixed ground type.

8. The energy capture device of claim 7 further including a means of controllably coupling pivot motion of said elongated support members to an energy conversion device.

9. The energy capture device of claim 7 further including a plurality of said flexible sheet of material joined to said sheet support members.

10. The energy capture device of claim 1 wherein said support structure is of a frame type.

11. The energy capture device of claim 10 further including a means of controllably coupling pivot motion of said elongated support members to an energy conversion device.

12. The energy capture device of claim 11 further including a plurality of said flexible sheet of material joined to said sheet support members.

13. The energy capture device of claim 10 further including a plurality of floatation devices.

14. The energy capture device of claim 13 further including a means of controllably coupling pivot motion of said elongated support members to an energy conversion device.

15. The energy capture device of claim 13 further including a plurality of said flexible sheet of material joined to said sheet support members.

16. An energy capture device, comprising
   (a) a plurality of elongated support members, aligned and located at spaced locations upon a reference plane,
   (b) a plurality of rotatable connectors,
   (c) a plurality of anchors,
   (d) a plurality of anchor members, (e) said elongated support members joined to said rotatable connectors so as to be able to pivot about said elongated support members longitudinal axis, (f) said rotatable connectors fixably attached to said anchor members, (g) said anchor members fixably attached to said anchors, (h) said anchors attached to a base, (i) a plurality of connection support members fixably joined to said elongated support members, (j) a plurality of connecting members joined to said connection support members so as to form a connection between said connection support members, (k) a plurality of sheet support members fixably joined to said elongated support members, (l) a plurality of sheet suspension members joined to said sheet support members so as to form a connection between said sheet support members, (m) a flexible sheet of material joined to said sheet suspension members.

17. The energy capture device of claim 16 further including a means of controllably coupling pivot motion of said elongated support members to an energy conversion device.

18. The energy capture device of claim 16 further including a plurality of said flexible sheet of material joined to said sheet support members.

19. The energy capture device of claim 16 wherein said anchor members are structurally rigid.

* * * * *